(12) United States Patent
Watanabe et al.

(10) Patent No.: US 7,544,587 B2
(45) Date of Patent: Jun. 9, 2009

(54) WAFER DIVIDING METHOD AND WAFER DIVIDING APPARATUS

(75) Inventors: Yosuke Watanabe, Tokyo (JP); Keiji Nomaru, Tokyo (JP); Nobumori Ogoshi, Tokyo (JP); Koichi Mitani, Tokyo (JP); Taizo Kise, Tokyo (JP); Kohei Matsumoto, Tokyo (JP); Tatsuya Inaoka, Tokyo (JP); Masaru Nakamura, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/650,503

(22) Filed: Jan. 8, 2007

(65) Prior Publication Data

US 2007/0164073 A1    Jul. 19, 2007

(30) Foreign Application Priority Data

Jan. 13, 2006   (JP) ............................. 2006-005893

(51) Int. Cl.
*H01L 21/301* (2006.01)

(52) U.S. Cl. ............... 438/460; 438/458; 257/E21.599; 451/9

(58) Field of Classification Search .......... 438/460–465
See application file for complete search history.

(56) References Cited

U.S. PATENT DOCUMENTS

| | | | | |
|---|---|---|---|---|
| 5,362,681 A | * | 11/1994 | Roberts et al. | ............... 438/464 |
| 5,441,615 A | * | 8/1995 | Mukai et al. | ........... 204/192.12 |
| 6,217,663 B1 | * | 4/2001 | Inokuchi et al. | ............. 118/728 |
| 2004/0266094 A1 | | 12/2004 | Nagai et al. | |
| 2005/0139964 A1 | * | 6/2005 | Ando | .......................... 257/620 |
| 2005/0153127 A1 | * | 7/2005 | Aihara et al. | ............... 428/343 |
| 2006/0024924 A1 | * | 2/2006 | Haji et al. | ................... 438/464 |
| 2006/0030129 A1 | * | 2/2006 | Ohmiya et al. | ............. 438/462 |
| 2007/0197002 A1 | * | 8/2007 | Kurosawa et al. | ........... 438/460 |

FOREIGN PATENT DOCUMENTS

| | | |
|---|---|---|
| DE | 10 2004 029 091 | 6/2004 |
| JP | 3408805 | 3/2003 |
| JP | 2005-19769 | 1/2005 |

* cited by examiner

*Primary Examiner*—Hsien-ming Lee
*Assistant Examiner*—Kevin Parendo
(74) *Attorney, Agent, or Firm*—Smith, Gambrell & Russell, LLP (57) ABSTRACT

A method of dividing, along lattice pattern-like dividing lines, a wafer which has the lattice pattern-like dividing lines and a polymer film on the front surface of a substrate and is processed to allow for division along the dividing lines, the method comprising a frame holding step for putting the wafer on the surface of an adhesive tape mounted on an annular frame; a wafer cooling step for cooling the wafer that is affixed to the surface of the adhesive tape mounted on the annular frame; and a diving step for dividing the wafer along the dividing lines by expanding the adhesive tape to which the cooled wafer is affixed.

5 Claims, 6 Drawing Sheets

WAFER DIVIDING METHOD AND WAFER DIVIDING APPARATUS

FIELD OF THE INVENTION

The present invention relates to a method of dividing a wafer such as a semiconductor wafer along predetermined dividing lines; and to a wafer dividing apparatus.

DESCRIPTION OF THE PRIOR ART

In the production process of a semiconductor device, a plurality of areas are sectioned by dividing lines which are formed in a lattice pattern on the front surface of a substantially disk-like semiconductor wafer, and a device such as IC or LSI is formed in each of the sectioned areas. Individual devices are manufactured by dividing this semiconductor wafer along the dividing lines.

As a means of dividing a plate-like workpiece such as a semiconductor wafer, Japanese Patent No. 3408805 discloses a laser processing method for applying a pulse laser beam having permeability for the workpiece with its focal point set to the inside of the area to be divided. In the dividing method making use of this laser processing technique, the workpiece is divided by applying a pulse laser beam of an infrared range having permeability for the workpiece from one side of the workpiece with its focal point set to the inside to continuously form a deteriorated layer in the inside of the workpiece along the dividing lines and exerting external force along the dividing lines whose strength has been reduced by the formation of the deteriorated layers.

JP-A 2005-19769 discloses a dividing apparatus for dividing a workpiece by exerting external force along dividing lines whose strength has been reduced by the formation of the above deteriorated layers. This dividing apparatus comprises a frame holding means for holding an annular frame on which a protective tape having the workpiece affixed thereto is mounted, and a tape expanding means for expanding the protective tape mounted on the annular frame held on the frame holding means, and divides the workpiece which is affixed to the protective tape and whose strength has been reduced along the dividing lines, along the dividing lines, by expanding the protective tape with the tape expanding means.

To improve the mechanical strength, chemical resistance and moisture resistance of a device, a wafer having a polymer protective film made of a polyimide resin, polybenzooxazole resin or silicon-based resin on the surface of a silicon substrate having devices formed thereon has recently been implemented. A wafer having a polymer insulating film as an interlayer insulating film for devices has also been implemented.

When the wafer having a polymer protective film or an insulating film is divided by using the above dividing apparatus, the silicon substrate whose strength has been reduced along the dividing lines is divided while the polymer film or the insulating film is stretched and not divided along the dividing lines. Even when the polymer protective film or the insulating film is divided, its divided surface becomes jagged, thereby reducing the quality of each device.

SUMMARY OF THE INVENTION

It is an object of the present invention to provide a wafer dividing method and a wafer dividing apparatus, both capable of dividing the polymer film of a wafer having the polymer film formed on the front surface of a substrate, along predetermined dividing lines without fail.

To attain the above object, according to the present invention, there is provided a method of dividing, along lattice pattern-like dividing lines, a wafer which has the lattice pattern-like dividing lines and a polymer film formed on the front surface of a substrate and is processed to allow for division along the dividing lines, the method comprising:

a frame holding step for putting the wafer on the surface of an adhesive tape mounted on an annular frame;

a frame cooling step for cooling the wafer that is affixed to the surface of the adhesive tape mounted on the annular frame; and a dividing step for dividing the wafer along the dividing lines by expanding the adhesive tape to which the cooled wafer is affixed.

The above cooling step is to cool the wafer to +5 to −20° C.

According to the present invention, there is also provided a wafer dividing apparatus for dividing a wafer which is put on an adhesive tape mounted on an annular frame so as to cover its inner opening, along predetermined dividing lines, the apparatus comprising:

a frame holding means having a holding surface for holding the annular frame;

a wafer pressing member having a pressing surface to be applied to the wafer mounting area of the adhesive tape mounted on the annular frame supported by the wafer holding means;

a moving means for moving the wafer pressing member from a relief position below the holding surface of the frame holding means to a pressing position above the holding surface of the frame holding means;

a cooling chamber formed above the holding surface of the frame holding means; and a cooling means for cooling the inside of the cooling chamber.

The above moving means moves the wafer pressing member from the relief position to the pressing position at a rate of 10 to 1,000 mm/sec, preferably 50 to 150 mm/sec.

The above cooling means cools the inside of the cooling chamber to +5 to −20° C.

According to the present invention, since the wafer affixed to the surface of the adhesive tape mounted on the annular frame is cooled and divided along the dividing lines by expanding the adhesive tape to which the cooled wafer is affixed, the polymer film formed on the front surface of the substrate is also cooled, whereby the polymer film is divided along the dividing lines surely without being stretched.

DETAILED DESCRIPTION OF THE PREFERRED EMBODIMENTS

Preferred embodiments of the wafer dividing method and the wafer dividing apparatus of the present invention will be described in detail hereinunder with reference to the accompanying drawings.

Figure 1:
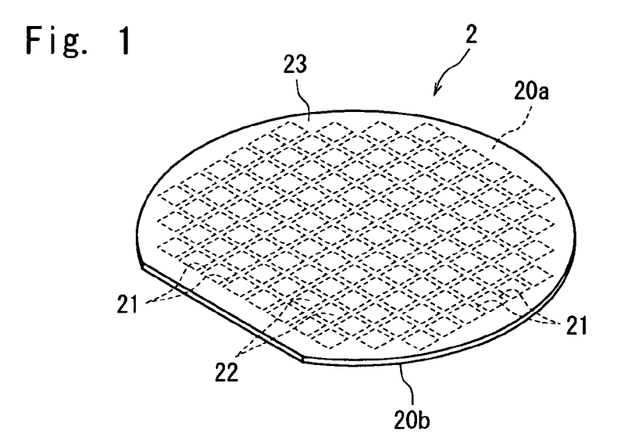
FIG. 1 is a perspective view of a semiconductor wafer as a wafer to be divided by the wafer dividing method of the present invention.
Figure 2:
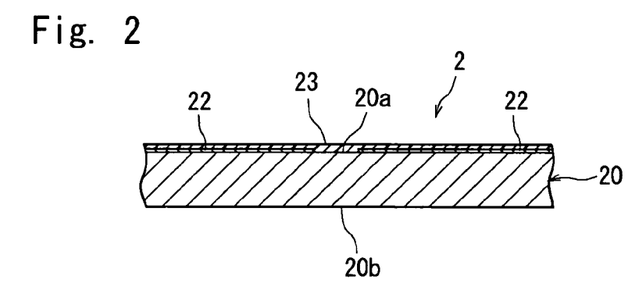
FIG. 2 is an enlarged sectional view of the semiconductor wafer shown in FIG. 1.

FIG. 1 is a perspective view of a semiconductor wafer to be divided into individual devices by the wafer dividing method of the present invention, and FIG. 2 is an enlarged sectional view of the principal portion of the semiconductor wafer shown in FIG. 1. In the semiconductor wafer 2 shown in FIG. 1 and FIG. 2, a plurality of dividing lines 21 are formed in a lattice pattern on the front surface of a semiconductor substrate 20 such as a silicon substrate. And, a device 22 such as IC or LSI is formed in a plurality of areas sectioned by the plurality of dividing lines 21 formed in a lattice pattern on the front surface 20a of the semiconductor substrate 20, and a protective film 23 (polymer film) made of a polymer such as a polyimide resin, polybenzooxazole resin or silicon-based resin is formed on these devices 22, as shown in FIG. 2.

An embodiment of the method of dividing the above semiconductor wafer 2 into individual devices along the dividing lines 21 will be described hereinunder.

In the illustrated embodiment, first comes the step of forming a deteriorated layer along the dividing lines 21 in the inside of the semiconductor substrate 20 by applying a pulse laser beam of a wavelength having permeability for the semiconductor substrate 20 of the semiconductor wafer 2 along the dividing lines 21 to reduce the strength of the semiconductor substrate 20 along the dividing lines 21. This deteriorated layer forming step is carried out by using a laser beam processing machine 3 shown in FIG. 3. The laser beam processing machine 3 shown in FIG. 3 comprises a chuck table 31 for holding a workpiece, a laser beam application means 32 for applying a laser beam to the workpiece held on the chuck table 31, and an image pick-up means 33 for picking up an image of the workpiece held on the chuck table 31. The chuck table 31 is designed to suction-hold the workpiece and to be moved in the processing-feed direction indicated by an arrow X and the indexing-feed direction indicated by an arrow Y in FIG. 3 by a moving mechanism that is not shown.

Figure 3:
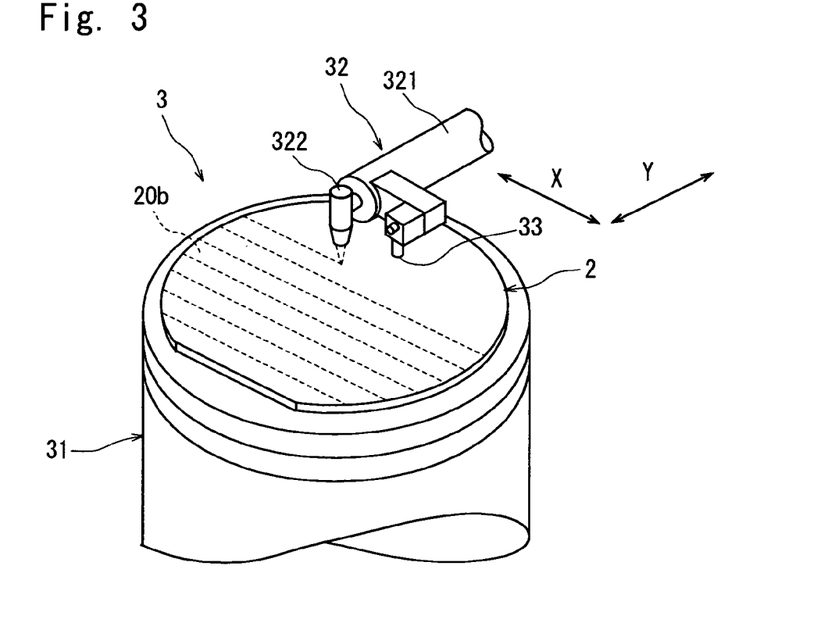
FIG. 3 is a perspective view of the principal portion of a laser beam processing machine for forming a deteriorated layer in the semiconductor wafer shown in FIG. 1.

The above laser beam application means 32 has a cylindrical casing 321 arranged substantially horizontally. In the casing 321, there is installed a pulse laser beam oscillation means (not shown) which comprises a pulse laser beam oscillator composed of a YAG laser oscillator or YVO4 laser oscillator and a repetition frequency setting means. A condenser 322 for converging a pulse laser beam oscillated from the pulse laser beam oscillation means is attached to the end of the above casing 321.

The image pick-up means 33 mounted on the end portion of the casing 321 constituting the above laser beam application means 32 is constituted by an infrared illuminating means for applying infrared radiation to the workpiece, an optical system for capturing infrared radiation applied by the infrared illuminating means, and an image pick-up device (infrared CCD) for outputting an electric signal corresponding to infrared radiation captured by the optical system, in addition to an ordinary image pick-up device (CCD) for picking up an image with visible radiation in the illustrated embodiment. An image signal is supplied to a control means that is not shown.

Figure 4:
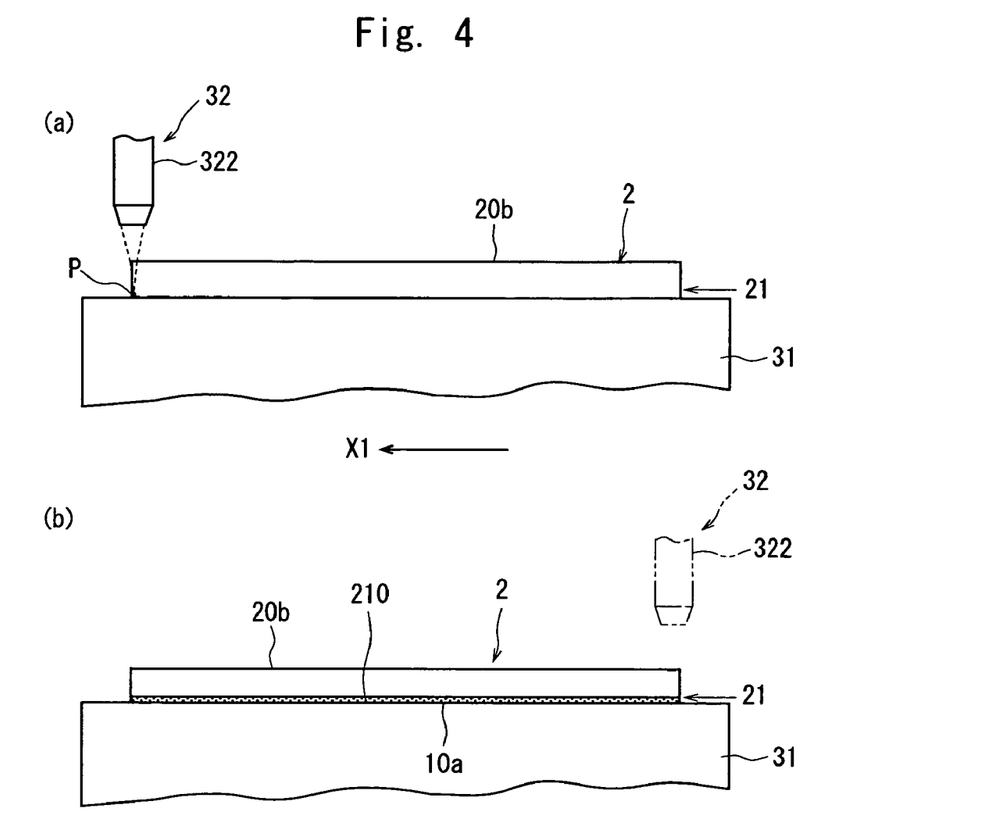
FIGS. 4(a) and 4(b) are explanatory diagrams showing the deteriorated layer forming step which is carried out by using the laser beam processing machine shown in FIG. 3.

The deteriorated layer forming step which is carried out by using the above laser beam processing machine 3 will be described with reference to FIGS. 3 to 5.

In this deteriorated layer forming step, the semiconductor wafer 2 is first placed on the chuck table 31 of the laser beam processing machine 3 shown in FIG. 3 in such a manner that the rear surface 20b of the semiconductor substrate 20 faces up, and suction-held on the chuck table 31. The chuck table 31 suction-holding the semiconductor wafer 2 is brought to a position right below the image pick-up means 33 by the moving mechanism that is not shown.

After the chuck table 31 is positioned right below the image pick-up means 33, alignment work for detecting the area to be processed of the semiconductor wafer 2 is carried out by the image pick-up means 33 and the control means that is not shown. That is, the image pick-up means 33 and the control means (not shown) carry out image processing such as pattern matching, etc. to align a dividing line 21 formed in a predetermined direction of the semiconductor wafer 2 with the condenser 322 of the laser beam application means 32 for applying a laser beam along the dividing line 21, thereby performing the alignment of a laser beam application position. The alignment of the laser beam application position is also carried out on dividing lines 21 formed on the semiconductor wafer 2 in a direction perpendicular to the above predetermined direction. Although the front surface 20a having the dividing lines 21 formed thereon of the semiconductor substrate 20 faces down at this point, as the image pick-up means 33 comprises an infrared illuminating means, an optical system for capturing infrared radiation and an image pick-up device (infrared CCD) for outputting an electric signal corresponding to the infrared radiation as described above, images of the dividing lines 21 can be picked up through the rear surface 20b of the semiconductor substrate 20.

After the dividing line 21 formed on the semiconductor wafer 2 held on the chuck table 31 is detected and the alignment of the laser beam application position is carried out as described above, the chuck table 31 is moved to a laser beam application area where the condenser 322 of the laser beam application means 32 for applying a laser beam is located as shown in FIG. 4(a) so as to bring one end (left end in FIG. 4(a)) of the predetermined dividing line 21 to a position right below the condenser 322 of the laser beam application means 32. The chuck table 31 is then moved in the direction shown by the arrow X1 in FIG. 4(a) at a predetermined processing-feed rate while a pulse laser beam of a wavelength having permeability for the semiconductor substrate 20 such as a silicon substrate is applied from the condenser 322. When the application position of the condenser 322 of the laser beam application means 32 reaches the other end (right end in FIG. 4(b)) of the dividing line 21 as shown in FIG. 4(b), the application of the pulse laser beam is suspended and the movement of the chuck table 31 is stopped. In this deteriorated layer forming step, the focal point P of the pulse laser beam is set to a position near the front surface 20a (undersurface) of the semiconductor substrate 20. As a result, a deteriorated layer 210 is formed from the front surface 20a (undersurface) toward the inside of the semiconductor substrate 20. This deteriorated layer 210 is formed as a molten and re-solidified layer.

The processing conditions in the above deteriorated layer forming step are set as follows, for example.

Light source: LD excited Q switch Nd:YVO4 laser

Wavelength: pulse laser beam having a wavelength of 1,064 nm

Repetition frequency: 50 kHz

Average output: 3 W

Focal spot diameter: 1 μm

Processing-feed rate: 100 mm/sec

Figure 5:
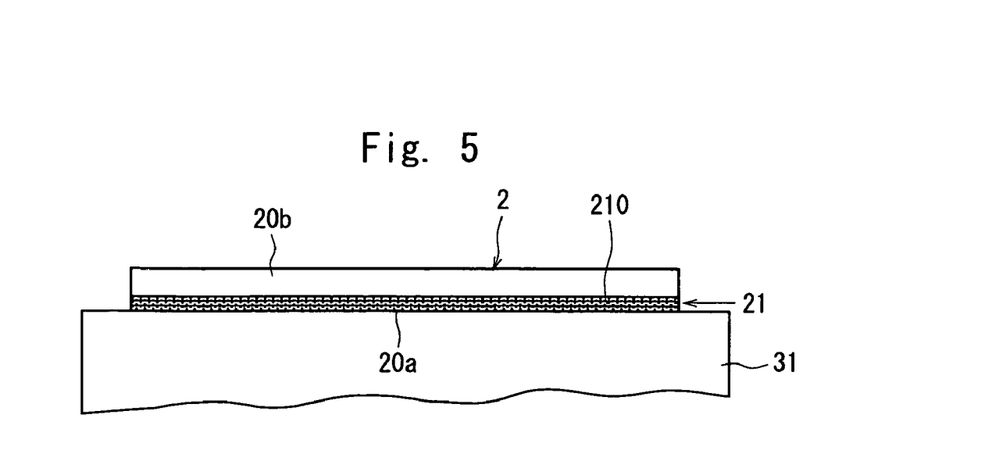
FIG. 5 is an explanatory diagram showing a state of the deteriorated layers being formed in the inside of the semiconductor wafer in the deteriorated layer forming step shown in FIGS. 4(a) and 4(b)

When the semiconductor substrate 20 is thick, as shown in FIG. 5, the above-described deteriorated layer forming step is carried out a plurality of times by changing the focal point P stepwise so as to form a plurality of deteriorated layers 210. For example, as the thickness of the deteriorated layer formed once under the above processing conditions is about 50 μm, the above deteriorated layer forming step is carried out three times to form deteriorated layers 210 having a total thickness of 150 μm. In the case of a semiconductor substrate 20 having a thickness of 300 μm, six deteriorated layers 210 may be formed in the inside of the semiconductor substrate 20 from the front surface 20a to the rear surface 20b along the dividing lines 21.

Figure 6:
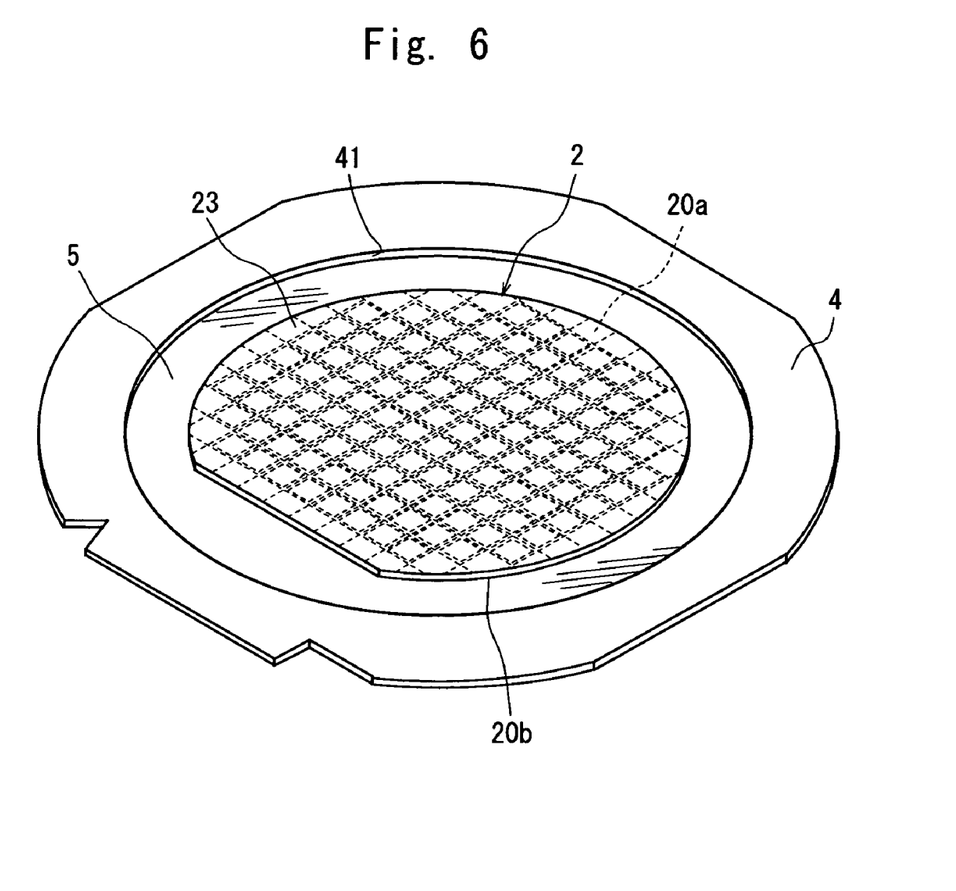
FIG. 6 is a perspective view of the semiconductor wafer which has been subjected to the deteriorated layer forming step and is put on the surface of an adhesive tape mounted to an annular frame.

After the deteriorated layer 210 is formed in the inside of the semiconductor wafer 2 along all the dividing lines 21 by the above-described deteriorated layer forming step, one side of the wafer is put on the surface of an adhesive tape which is mounted on an annular frame (wafer supporting step). That is, as shown in FIG. 6, the rear surface 20b of the semiconductor substrate 20 of the semiconductor wafer 2 is put on the surface of the adhesive tape 5 whose peripheral portion is mounted on the annular frame 4 so as to cover its inner opening 41. The adhesive tape 5 has an acrylic resin adhesive layer having a thickness of about 5 μm on the surface of a 70 μm-thick sheet backing made of polyvinyl chloride (PVC) in the illustrated embodiment.

The above wafer supporting step may be carried out before the above deteriorated layer forming step. In this case, the front surface 20a of the semiconductor substrate 20 of the semiconductor wafer 2 is put on the surface of the above adhesive tape 5 mounted on the annular frame 4 (therefore, the rear surface 20b of the semiconductor substrate 20 of the semiconductor wafer 2 faces up). Then, the above deteriorated layer forming step is carried out in a state where the semiconductor wafer 2 is mounted on the above adhesive tape 5 mounted on the annular frame 4.

After the above deteriorated layer forming step and the wafer supporting step, next comes the step of cooling the semiconductor wafer 2 affixed to the surface of the adhesive tape 5 mounted on the annular frame 4 and the step of dividing the semiconductor substrate 20 and the protective film 23 along the dividing lines 21 by expanding the adhesive tape 5 to which the cooled semiconductor wafer 2 is affixed.

A description is subsequently given of a wafer dividing apparatus for carrying out the wafer cooling step and the dividing step with reference to FIG. 7 and FIG. 8.

Figure 7:
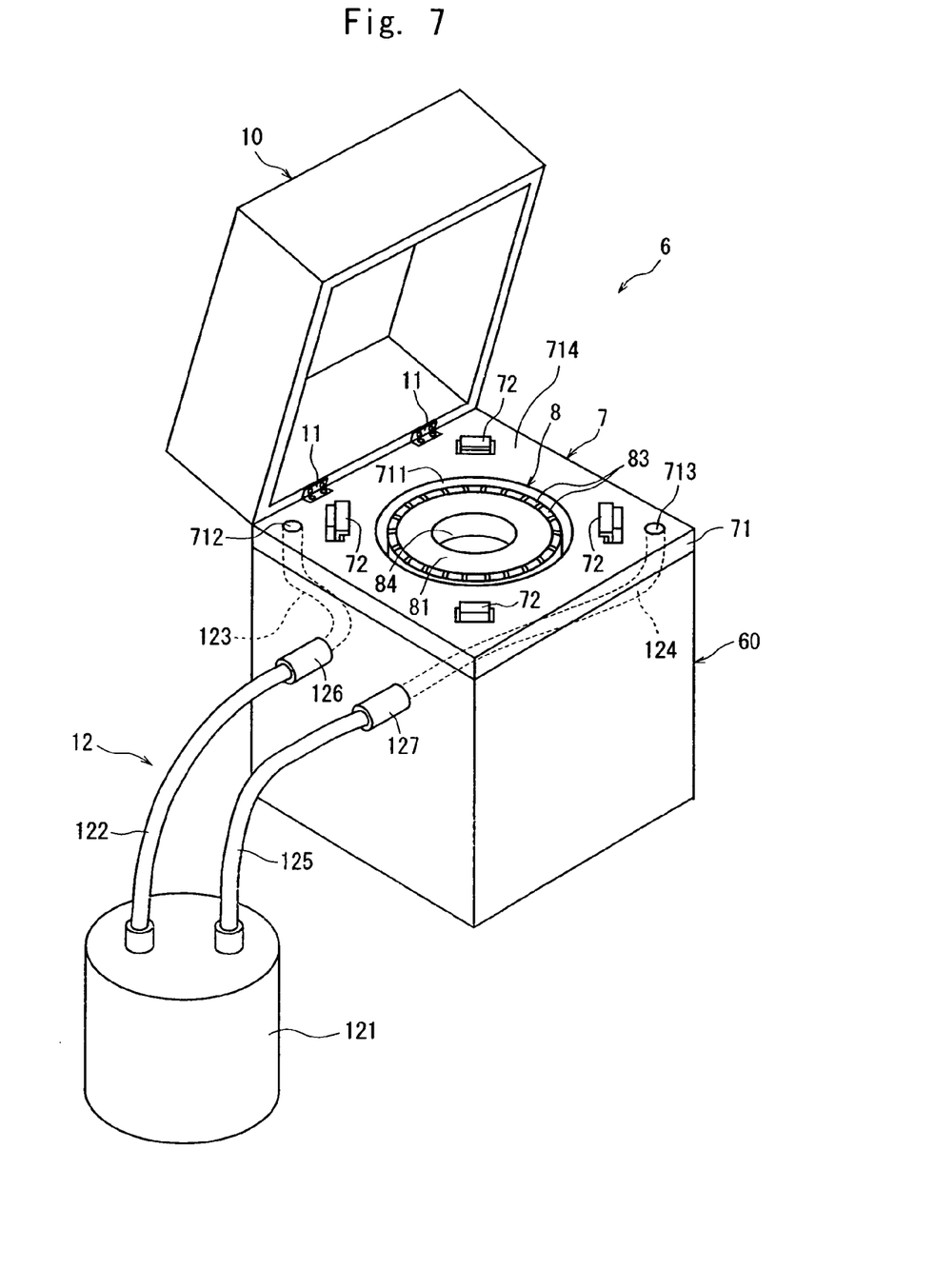
FIG. 7 is a perspective view of a wafer dividing apparatus for carrying out the wafer cooling step and the dividing step in the wafer dividing method of the present invention.
Figure 8:
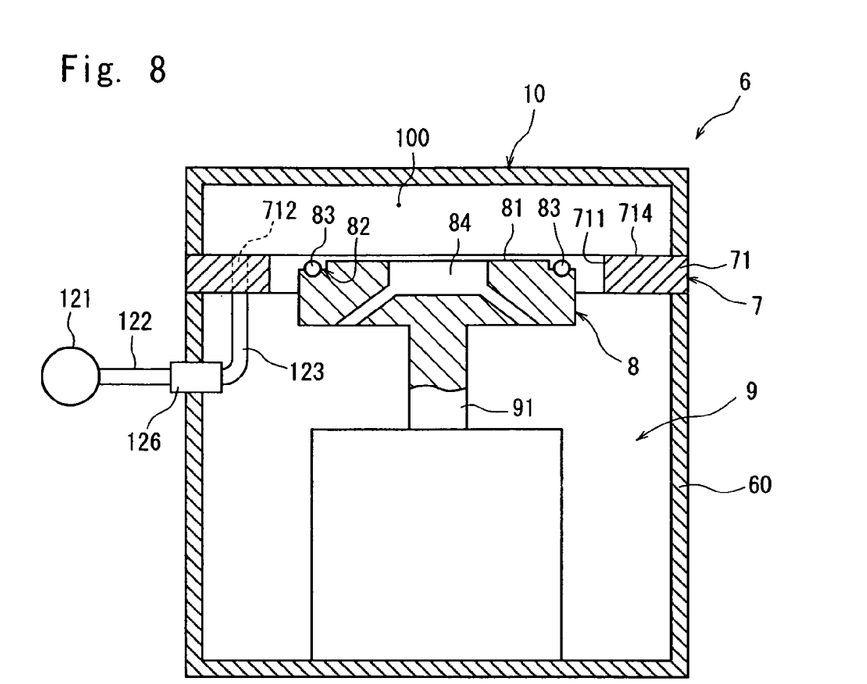
FIG. 8 is a sectional view of the wafer dividing apparatus shown in FIG. 7.

FIG. 7 is a perspective view of the wafer dividing apparatus constituted according to the present invention, and FIG. 8 is a sectional view of the wafer dividing apparatus shown in FIG. 7.

The wafer dividing apparatus 6 shown in FIG. 7 and FIG. 8 has a rectangular parallelepiped housing 60 which is open at the top. A frame holding means 7 for holding the above annular frame 4 is installed on top of this housing 60. The frame holding means 7 is composed of a plate-like holding member 71 and clamps 72 arranged in each of four corner portions of the holding member 71. The holding member 71 has an opening 711 with the same diameter as the diameter of the opening 41 of the above annular frame 4 at the center, a cooling gas introduction port 712 and a cooling gas exhaust port 713. The holding member 71 thus formed has a top surface functioning as a holding surface 714 for holding the above annular frame 4. The frame holding means 7 constituted as described above fixes the annular frame 4 on the holding surface 714 of the holding member 71 by the clamps 72 to hold the annular frame 4.

In the above housing 60, there are installed a wafer pressing member 8 which acts on the wafer affixing area of the adhesive tape 5 mounted on the annular frame 4 held on the above frame holding means 7 and a moving means 9 for moving this wafer pressing member 8 from a relief position shown in FIG. 8 below the holding surface 714 of the holding member 71 to a pressing position above the holding surface 714. The wafer pressing member 8 is circular with an outer diameter smaller than the diameter of the opening 711 formed in the above holding member 71 and its top surface serves as a pressing surface 81. An annular groove 82 is formed in the peripheral portion of the top surface of the wafer pressing member 8 and a plurality of expansion aid rollers 83 are fitted in this annular groove 82. The expansion aid rollers 83 reduce friction resistance which is generated when the wafer pressing member 8 is moved up to the pressing position to expand the adhesive tape 5. An air escape hole 84 open to the pressing surface 81 is desirably formed in the center portion of the wafer pressing member 8. The above moving means 9 is composed of an air cylinder mechanism as shown in FIG. 8 in the illustrated embodiment, and the above wafer pressing member 8 is connected with the upper end of its piston rod 91. When the wafer pressing member 8 is at the relief position, the pressing surface 81 is positioned 5 mm below the holding surface 714 of the holding member 71 in the illustrated embodiment. When the wafer pressing member 8 is at the pressing position, the pressing surface 81 is positioned 20 mm above the holding surface 714 of the holding member 71 in the illustrated embodiment.

The wafer dividing apparatus 6 in the illustrated embodiment has a cover 10 for forming a cooling chamber above the holding surface 714 of the holding member 71 constituting the above frame holding means 7. This cover 10 is rectangular parallelepiped and is open at the bottom, and one side thereof is connected with the holding member 71 of the frame holding means 7 by hinges 11 as shown in FIG. 7. The cover 10 constituted as described above is placed on the top of the holding member 71 as shown in FIG. 8 to form a cooling chamber 100 above the holding surface 714 of the holding member 71. The cover 10 preferably has a heat insulating structure.

The wafer dividing apparatus 6 in the illustrated embodiment comprises a cooling means 12 for cooling the inside of the above cooling chamber 100. The cooling means 12 in the illustrated embodiment comprises a cooling gas feed means 121, cooling gas feed pipes 122 and 123 for connecting the cooling gas feed means 121 to the cooling gas introduction port 712 formed in the holding member 71 of the above frame holding means 7 and cooling gas exhaust pipes 124 and 125 for connecting the cooling gas exhaust port 713 formed in the holding member 71 to the cooling gas feed means 121. The above cooling gas feed means 121 supplies a +5 to −20° C. cooling gas. The above cooling gas feed pipes 122 and 123 are interconnected by a connection pipe 126 installed in the side wall of the housing 60. The above cooling gas exhaust pipes 124 and 125 are interconnected by a connection pipe 127 installed in the side wall of the housing 60.

The wafer dividing apparatus 6 in the illustrated embodiment is constituted as described above, and the wafer cooling step and the dividing step which are carried out by using this wafer dividing apparatus 6 will be described hereinunder.

First, the cover 10 of the dividing apparatus 6 is opened by turning it upward with the hinge 11 as its pivot, as shown in FIG. 7. At this point, the wafer pressing member 8 is at the relief position shown in FIG. 8. After the cover 10 is opened, the annular frame 4 supporting the semiconductor wafer 2 through the adhesive tape 5 as shown in FIG. 6 is placed on the holding surface 714 of the holding member 71 constituting the frame holding means 7 (see FIG. 9). Then, the annular frame 4 is fixed on the holding member 71 by the clamps 72 (frame holding step).

Figure 9:
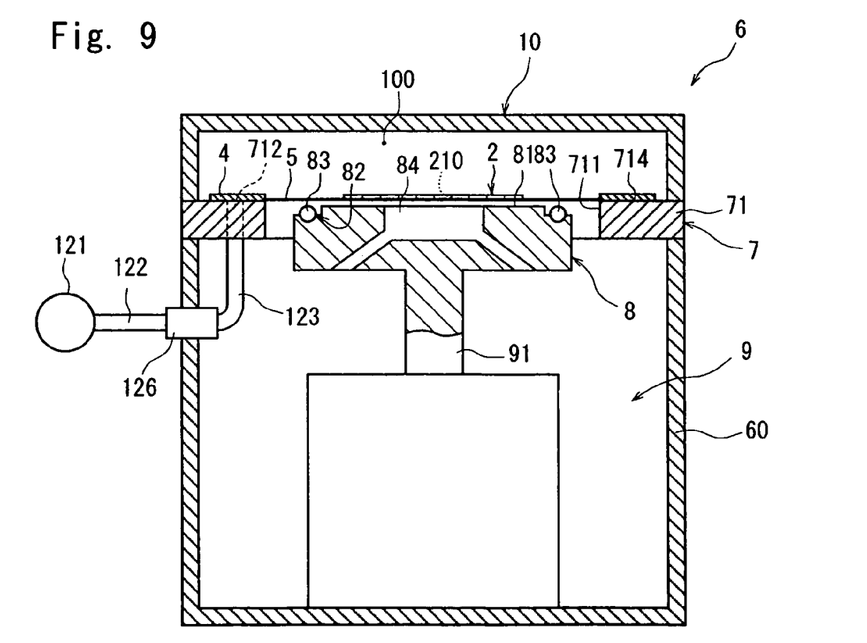
FIG. 9 is an explanatory diagram showing the wafer cooling step in the wafer dividing method of the present invention.

After the above frame holding step, the cover 10 is closed as shown in FIG. 9.

Thereafter, the cooling means 12 is activated to introduce a cooling gas into the cooling chamber 100 through the cooling gas feed pipes 122 and 123 and the cooling gas introduction port 712. As a result, the semiconductor wafer 2 exposed to the cooling chamber 100 is cooled (wafer cooling step). The cooling gas introduced into the cooling chamber 100 is returned to the cooling means 12 from the cooling gas exhaust port 713 through the cooling gas exhaust pipes 124 and 125. In this cooling step, the cooling chamber 100 is cooled to +5 to −20° C.

Figure 10:
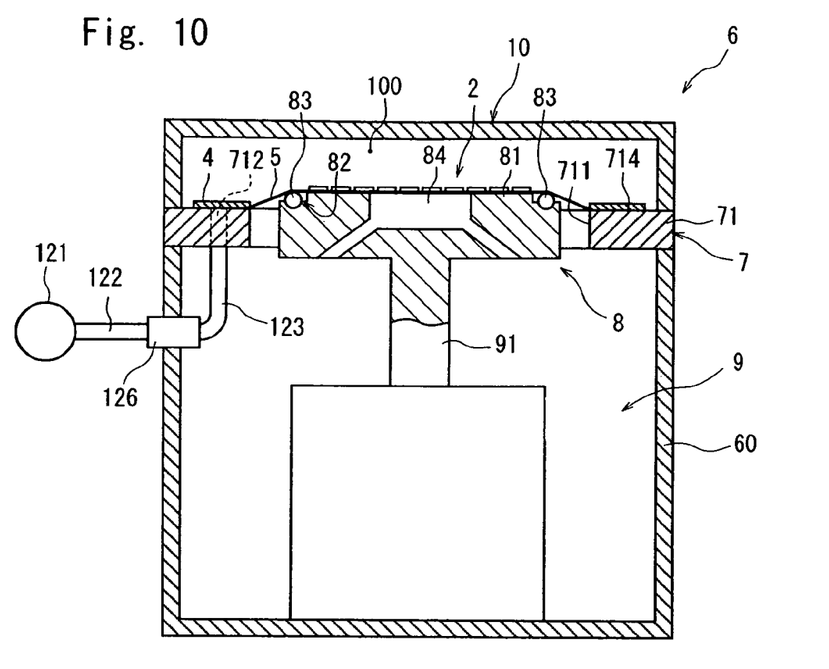
FIG. 10 is an explanatory diagram showing the dividing step in the wafer dividing method of the present invention.
Figure 11:
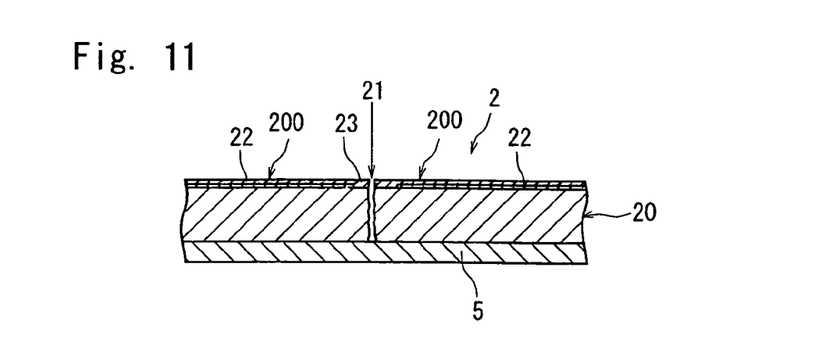
FIG. 11 is a partially enlarged sectional view showing a state where the wafer has been subjected to the dividing step shown in FIG. 10 and divided into individual devices.

Then, the moving means 9 which is composed of the air cylinder mechanism is activated to carry out the dividing step for moving the wafer pressing member 8 up to the pressing position, as shown in FIG. 10. As a result, the pressing surface 81 of the wafer pressing member 8 is brought into contact with the wafer affixing area 51 of the adhesive tape 5 mounted on the annular frame 4 to thrust up the adhesive tape 5, whereby the adhesive tape 5 is expanded. Therefore, tensile force acts radially on the semiconductor wafer 2 to which the adhesive tape 5 is affixed. When tensile force is exerted radially to the semiconductor wafer 2 as described above, the semiconductor substrate 20 of the semiconductor wafer 2 is divided along the deteriorated layers 210 because the strength of the semiconductor substrate 20 of the semiconductor wafer 2 is reduced along the deteriorated layers 210 formed along the dividing lines 21. Simultaneously with the division of the semiconductor substrate 20 of the semiconductor wafer 2 along the deteriorated layers 210, the protective film 23 (polymer film) formed on the front surface 20a of the semiconductor substrate 20 is also divided along the dividing lines 21 where the deteriorated layer 210 has been formed to obtain individual devices 200 as shown in FIG. 11. Since the semiconductor wafer 2 (semiconductor substrate 20 and the protective film 23) is cooled to +5 to −20° C. at this point, the protective film 23 is divided along the dividing lines 21 surely without being stretched. In the above dividing step, the speed for moving the wafer pressing member 8 from the relief position to the pressing position may be 10 to 1,000 mm/sec, preferably 50 to 150 mm/sec. Since the escape hole 84 is formed in the center portion of the wafer pressing member 8 in the illustrated embodiment, when the wafer pressing member 8 is moved up in the above dividing step, air does not gather in the space between the pressing surface 81 and the adhesive tape 5, whereby the adhesive tape 5 can be expanded smoothly.

In the illustrated embodiment, the semiconductor substrate 20 and the protective film 23 of the semiconductor wafer 2 where the deteriorated layers 210 have been formed are divided at the same time along the dividing lines 21 formed in a lattice pattern by using the dividing apparatus 6. The dividing apparatus 6 may be used to carry out the step of dividing only the protective film 23 formed on the front surface 20a of the semiconductor substrate 20. That is, after the above deteriorated layer forming step, the semiconductor substrate 20 is divided along the dividing lines 21 where the deteriorated layer 210 has been formed by exerting external force to the semiconductor wafer 2 and then, the dividing step is carried out by using the dividing apparatus 6 to divide the protective film 23 formed on the front surface 20a of the semiconductor substrate 20, thereby obtaining individual devices 200.

What is claimed is:

1. A wafer dividing apparatus for dividing a wafer having a substrate with a protective film on a surface of the substrate, which substrate is put on an adhesive tape that is mounted on an annular frame so as to cover an inner opening of the annular frame, the annular frame dividing the wafer along predetermined dividing lines, the apparatus comprising:

a frame holding means having a holding surface for holding the annular frame;

a wafer pressing member having a pressing surface to be applied to a wafer mounting area of the adhesive tape mounted on the annular frame supported by a wafer holding means;

a cooling chamber, formed above the holding surface of the frame holding means, and including a cover to open and close for heat insulating the frame holding means, the cooling chamber being between the cover and the holding surface of the frame holding means;

a cooling means being a cooling gas feed means which feeds a cooling gas into the cooling chamber; and a moving means for moving the wafer pressing member from a relief position below the holding surface of the frame holding means to a pressing position above the holding surface of the frame holding means to expand the adhesive tape and to divide the protective film with tensile force at the time of cooling.

2. The wafer dividing apparatus according to claim 1, wherein the moving means moves the wafer pressing member from the relief position to the pressing position at a rate of 10 to 1,000 mm/sec.

3. The wafer dividing apparatus according to claim 2, wherein the moving means moves the wafer pressing member from the relief position to the pressing position at the rate of 50 to 150 mm/sec.

4. The wafer dividing apparatus according to claim 1, wherein the cooling means cools the inside of the cooling chamber to +5 to −20 °C.

5. The wafer dividing apparatus according to claim 1, wherein the wafer pressing member has an air escape hole in the center thereof.

* * * * *